United States Patent [19]

Severiens

[11] Patent Number: 5,286,437
[45] Date of Patent: Feb. 15, 1994

[54] METHOD AND INSTALLATION FOR THE PRODUCTION OF PLASTIC PRODUCTS WITH THE AID OF A HOT MIXTURE OF PVC POWDER AND ADDITIVES, AND A HOT MIXER SUITABLE FOR USE WITH THIS METHOD

[75] Inventor: Hendrik Severiens, Gramsbergen, Netherlands

[73] Assignee: Wavin B.V., Netherlands

[21] Appl. No.: 930,512

[22] PCT Filed: Mar. 28, 1991

[86] PCT No.: PCT/NL91/00053
§ 371 Date: Sep. 30, 1992
§ 102(e) Date: Sep. 30, 1992

[87] PCT Pub. No.: WO91/15347
PCT Pub. Date: Oct. 17, 1991

[30] Foreign Application Priority Data

Apr. 10, 1990 [NL] Netherlands .................. 9000840

[51] Int. Cl.⁵ .................. B29B 7/28; B29C 47/36
[52] U.S. Cl. .................. 264/211; 264/211.23; 264/349; 366/76; 366/282; 425/204; 425/205; 425/209
[58] Field of Search .................. 264/176.1, 211, 211.23, 264/141, 349; 425/209, 204, 205; 366/76, 282

[56] References Cited

U.S. PATENT DOCUMENTS

| | | |
|---|---|---|
| 3,522,934 | 8/1970 | Walter . |
| 3,884,607 | 5/1975 | Gerhards .................. 425/204 |
| 4,197,381 | 4/1980 | Alia . |
| 4,243,629 | 1/1981 | Tramezzani .................. 264/211.21 |
| 4,322,170 | 3/1982 | Papenmeier . |
| 4,446,086 | 5/1984 | Molenaar et al. .................. 264/141 |
| 4,528,155 | 9/1985 | Elder . |
| 4,889,673 | 12/1989 | Takimoto .................. 264/349 |
| 5,124,373 | 6/1992 | Baumgaertel .................. 264/176.1 |
| 5,198,170 | 3/1993 | Hawrylko .................. 264/141 |

FOREIGN PATENT DOCUMENTS

| | | |
|---|---|---|
| 2149668 | 3/1980 | European Pat. Off. . |
| 0008712 | 10/1971 | Fed. Rep. of Germany . |
| 2730283 | 10/1978 | Fed. Rep. of Germany . |
| 3710418 | 9/1988 | Fed. Rep. of Germany .................. 264/211.23 |
| 640357 | 11/1963 | France . |
| 274964 | 2/1962 | Netherlands . |

OTHER PUBLICATIONS

Plastics Engineering, Feb. 1981, "Engineering an in-house PVC Compounding System", pp. 34–36 International Search Report, 1st & 2nd Written Opinions, Netherlands Search Report, International Preliminary Examination Report.
Kunststoffberater, vol. 28, No. 3, Mar. 1983, (Frankfurt-/Main, DE) M. Weber, "Kontinuierliche PVC-Autbereitung auf der Verarbeitungsmaschine".

Primary Examiner—Jeffery Thurlow
Attorney, Agent, or Firm—Wigman, Cohen, Leitner & Myers

[57] ABSTRACT

A method is disclosed for the production of extruded plastic products by using an extruder (1) which has an extruder hopper (2) which is supplied with a hot mixture obtained by discontinuous mixing of PVC powder and aditives in a hot mixing zone, with the supply of frictional heat, wherein a first amount of PVC powder is mixed with an excess of additives with the supply of frictional heat, after which the mixture thus obtained is homogenised in the same mixing zone with a supplementary amount of PVC powder, in such a way that the final mixture has the desired concentration of additives, after which the hot mixture obtained after homogenisation is fed directly to the extruder hopper (2). An installation for the production of plastic products by extrusion, comprising a discontinuously operating hot mixer is also disclosed, as well as said hot mixer (3).

18 Claims, 1 Drawing Sheet

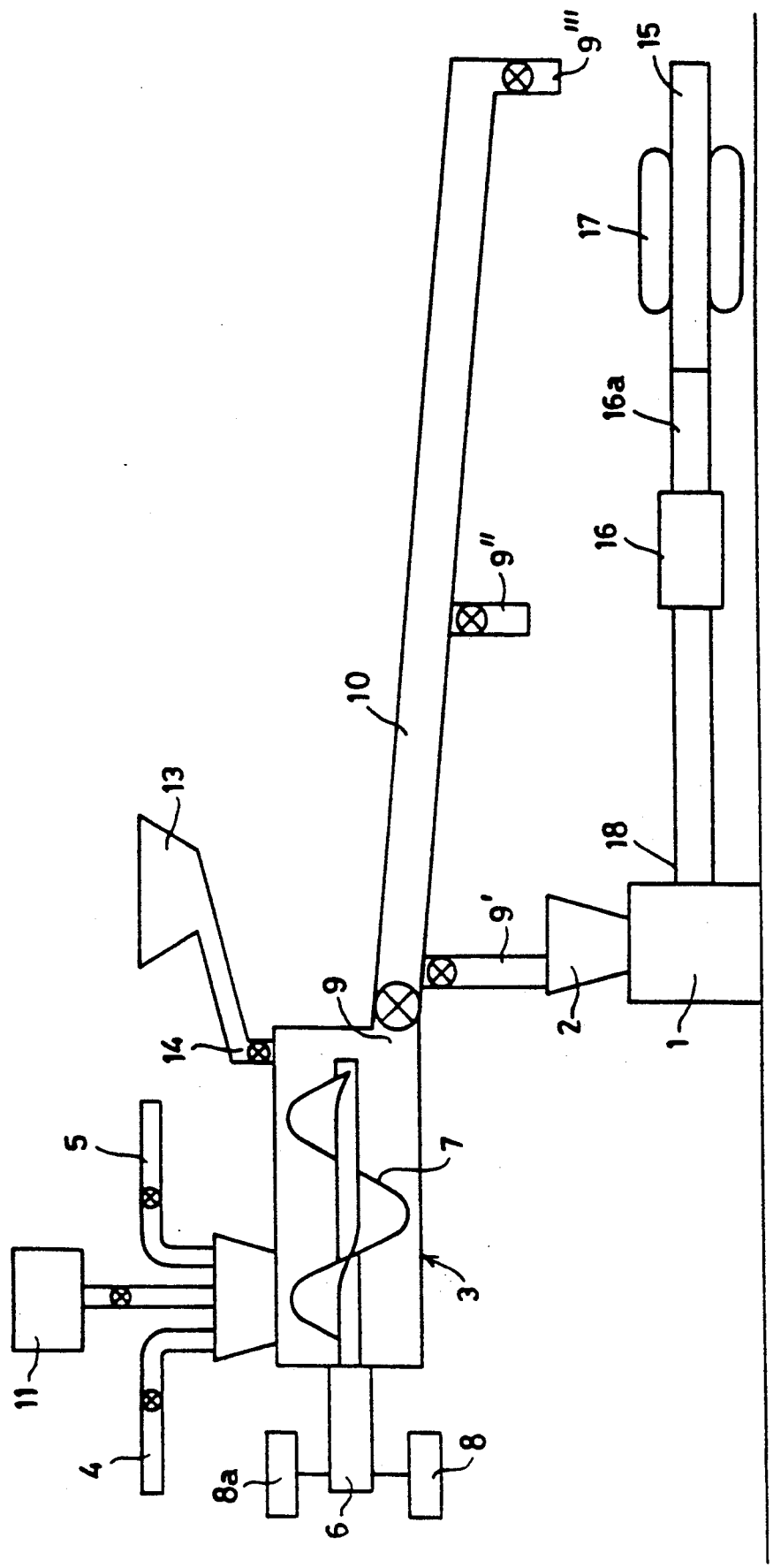

METHOD AND INSTALLATION FOR THE PRODUCTION OF PLASTIC PRODUCTS WITH THE AID OF A HOT MIXTURE OF PVC POWDER AND ADDITIVES, AND A HOT MIXER SUITABLE FOR USE WITH THIS METHOD

BACKGROUND OF THE INVENTION

The invention relates to a method for the production of extruded plastic products using an extruder which has an extruder hopper which is supplied with a hot mixture obtained by discontinuous mixing of PVC powder and additives in a hot mixing zone, with the supply of frictional heat.

A method of this type is known EP-A-0 008 712. In this method the additives become predominantly soft or fluid at the elevated temperatures, as a consequence of frictional heat, as a result of which the said additives adhere very well to the PVC powder.

Following the preparation of this mixture by discontinuous hot mixing, the mixture obtained is transferred into a horizontal rotating and homogenising heat-retaining silo, from which the extruder is fed continuously or discontinuously. With this method the additives can be supplied to the mixer from a central weighing installation.

One drawback of this method is that a horizontal heat-retaining silo is needed in the extrusion line, while, moreover, a great deal of space is lost because a high vertical mixing installation is positioned above each extruder, as a result of which the building costs for a factory are appreciably increased.

SUMMARY AND ADVANTAGES OF THE INVENTION

The aim of the invention is, now, to provide a method of the type mentioned in the preamble, with which method a horizontal rotating and homogenising heat-retaining silo is no longer needed, since the hot mixture obtained is fed directly to an extruder hopper of an extruder without the use of special installations for keeping the mixture hot, while, moreover, less space is required for installing a mixing zone above the extruder, so that the building costs for a factory are reduced.

This aim is achieved according to the invention in that a first amount of PVC powder is mixed with an excess of additives with the supply of frictional heat, after which the mixture thus obtained is homogenised in the same mixing zone with a supplementary amount of PVC powder, in such a way that the final mixture has the desired concentration of additives, after which the hot mixture obtained after homogenisation is fed directly to the extruder hopper. When a method of this type is used, the hot mixture obtained after homogenisation can be fed directly to an extruder hopper, even temperature fluctuations of, for example, 10° C. having no influence on the processing of the plastic.

Due to the low temperature of the mixture as obtained according to the method of the invention, preferably between 70° and 90° C., no agglomeration of the mixture occurs and the mixture remains readily flowable, which is in contrast to mixtures at higher temperature such as are obtained with a single-step mixing method.

In addition, this method has the advantage that it makes possible a high flexibility in the production, since an optimum formulation is now possible per extrusion line and per product.

Moreover, this method can be used for all possible extrusion applications. Even in the case of extrusion of corrugated drainage tubing, where, because of the thin wall of the tubing and the stretching of the plastic tubing to form the corrugations, malfunctions in extrusion immediately cause problems, malfunctions no longer occur when this method is used.

Finally, smoother products are obtained with an equal yield compared with processing with cold mixtures, as a result of which a higher yield per extruder is possible. At the same time, an optimum grade can be obtained per extrusion line since the material flows can now be accurately monitored and controlled from raw material to end product.

Finally, a fully integrated automation of the process is possible. It is pointed out that it is known per se to mix PVC powder with additives at elevated temperatures and to feed the resulting product continuously directly to an extruder without the use of a horizontal rotating and homogenising heat-retaining silo. A disadvantage is, however, that with this method the supply of raw material to the hot mixer must also be continuous, in which case it has been found that a volumetric metering of the relatively small amounts of additive is insufficiently accurate and, therefore, use must be made of a much more expensive weight metering. Consequently, the total investment costs for an extrusion line are very high.

In addition, it is also known (Kunststoffberater 31983, page 24) to mix PVC powder with an excess of additives in a hot mixer, after which the mixture obtained is transferred to a cool mixer, where it is mixed with a supplementary amount of polyvinyl chloride powder in order to obtain the desired concentration of additives in the final mixture, and in which cool mixer the mixture is cooled and homogenised, after which the powder mix is stored in hoppers, from which extruders are fed.

A drawback is that with this method the energy consumption for the entire method is higher than in the case of the method according to the invention, since the homogenised mixture must be cooled and must then be fully heated up again for extrusion. In addition, the total investment in equipment and space is much higher Expediently the temperature is raised to a temperature above 80° C., preferably of 100° to 140° C., during mixing, with the supply of frictional heat.

The ratio of first amount of PVC powder to supplementary amount of PVC powder is between approximately 2:1 and 1:2, but preferably identical amounts of first amount of PVC powder and supplementary amount of PVC powder are used, so that the ratio is about 1:1.

The mixing and homogenisation is expediently carried out in a horizontal mixer, as a result of which relatively little space is required above the extruder for the installation of a hot mixer of this type.

Although the hot mixture obtained after the homogenisation is usually fed to one extruder, it can be advisable for extruders with a low yield to fill the hot mixture into several extruder hoppers, with the aid of a distributing installation. In this case it is necessary that all these extruders use the same formulation.

However, the extruder hoppers can also be filled in turn; in this case it is then possible to use different formulations.

In addition, the invention relates to an installation for hot mixing PVC and additives for extrusion, in accordance with the method of the invention.

Finally, the invention relates to a hot mixer for hot mixing PVC and additives prior to extrusion.

BRIEF DESCRIPTION OF THE DRAWING

The invention will now be illustrated with reference to an exemplary embodiment with the aid of the appended figure, in which an installation for carrying out the method according to the invention is shown diagrammatically.

DETAILED DESCRIPTION OF A PREFERRED EMBODIMENT

The diagram shows an extruder 1 with an extruder hopper 2 and a hot mixer 3, which is positioned above this extruder and operates discontinuously, for mixing PVC powder and additives with the supply of frictional heat.

The hot mixer 3 is provided with drive means 6 for driving the mixing elements 7 of the hot mixer.

The drive means 6 can be set to various speeds of revolution. At a high speed of revolution, the mixing elements can consequently supply a large amount of frictional energy and therefore form a hot mixture of PVC powder and additives. The mixing elements 7 can then serve as homogenising elements at a low speed of revolution, after which the hot mixture containing an excess of additives is homogenised with a supplementary amount of PVC powder in order to achieve the desired concentration of additives.

The outlet 9 of the hot mixer opens directly into an extruder hopper 2.

In order to fill extruder hoppers of several extruders which operate at low capacity, the hot mixer outlet 9 can expediently be provided with a distributing installation 10 to feed several outlets 9', 9" and 9'''.

The hot mixer 3 is preferably a horizontal hot mixer, for example of a type which largely corresponds to a mixer as described in German Patent 27 30 283.

The hot mixer is provided with an additive feed 4, which can be shut off, and with a PVC powder feed 5, which can be shut off.

After feeding a specific amount of additives to a first amount of PVC powder fed through PVC powder feed 5, both the additive feed 4 and the PVC powder feed 5 are closed, after which, after mixing with the supply of frictional heat, the PVC powder feed 5 is opened again and the supplementary amount of PVC powder is fed in.

Instead of using only original PVC powder, the installation is also provided with a feed 11 for broken or ground polyvinyl chloride, as a consequence of which broken or ground polyvinyl chloride to be reprocessed can be used.

The installation can also be provided with a colorant feed 14 for feeding colorant from colorant reservoir 13. This colorant is appropriately fed to the mixer If desired, direct feeding to the extruder is also possible.

During mixing with the supply of frictional heat, the mixture is heated to a temperature of 110° C. when use is made of a mixture of PVC powder with twice the amount of additives During this operation the mixing elements 7 of hot mixer 3 are driven to a high speed of revolution (1100 rev/min) by the drive means 6, controlled by first con means 8.

The speed of revolution of the mixing elements 7 of the hot mixer is then reduced to a low speed of revolution of 550 rev/min using second control means 8a. A second amount of PVC powder at ambient temperature, which amount is identical to the first amount of PVC powder already present in the mixer, is then fed to the mixer 3 and the mixture is homogenised for 1 minute at the low speed of revolution of 550 rev/min.

During this operation the temperature of the hot mixture of PVC and the desired amount of additives falls to 80° C.

The hot mixture is then fed directly, via hot mixer outlet 9, into extruder hopper 2 and from there directly into extruder 1 with extrusion head 18, which extrudes a tube 15, which is calibrated and cooled in calibrating bush 16 and cooler 16a and removed via drawbench 17.

During extrusion, no "plate out" deposition is observed, the energy consumption in the method according to the invention is very low and the mixing costs per extruder are low, while the hot mixture is outstandingly suitable for all possible applications, in particular tubing, including corrugated drainage tubing.

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. Method for the production of extruded plastic products using an extruder which has an extruder hopper comprising the steps of:

providing a hot mixture obtained by mixing PVC and an excess of additives with respect to the amount of additives as required in the final mixture to be supplied to the extruder in a hot mixing zone which includes a supply of frictional heat by high speed rotating mixing elements of the hot mixing zone;

homogenizing the mixture thus obtained in the same mixing zone with a supplementary amount of PVC of low temperature in order to obtain a final mixture having the desired concentration of additives, said homogenizing ocurring at a temperature below 100° C. and said homgenizing being effected by the mixing elements rotating at a speed which does not substantially produce frictional heat;

feeding the hot mixture obtained after homogenization directly to the extruder hopper; and extruding the plastic products.

2. Method according to laim 1, wherein the ratio of first amount of PVC powder to the supplementary amount of PVC powder is between approximately 2:1 and 1:2.

3. Method according to claim 1, wherein the mixing with the supply of frictional heated is continued until the mixture has reached a temperture of above 80° C.

4. Method according to claim 1, wherein the supplementary amount of PVC has a temperature of below 30° C.

5. Method according to claim 1, wherein the final mixture has a temperature of between 70° C. and 90° C.

6. Method according to claim 1, wherein one hot mixer feeds one extruder.

7. Method according to claim 1, wherein the hot mixture obtained after homogenization is fed from the mixer to several extruders.

8. Method according to claim 1, wherein the mixing and homogenization steps are carried out in a horizontal mixer.

9. Method according to claim 1, wherein the PVC employed is in the powder form.

10. Installation for the production of extruded products comprising:

an extruder with a hopper;

a discontinuously operable hot mixer, which has a closable additive feed, a closable PVC and additives with the supply of frictional heat, the hot mixer being provided with drive means for driving mixing elements of the hot mixer to a first speed of revolution for providing frictional heat during mixing of PVC and additives;

the drive means comprising a two-speed control means, said first control means for driving the mixing elements of the hot mixer to said first speed of revolution; a second control means for driving the mixing means at a second speed of revolution, lower than said first speed, for homogenizing substantially without providing further frictional heat to a hot mixture of PVC and additives obtainable following the action of the mixing elements at said first speed of revolution, with a supplementary amount of PVC, in order to adjust the additive concentration in the final mixture to a desired value; and the outlet of the hot mixer being connected directly to said hopper of said extruder.

11. Installation according to claim 10, wherein the hot mixer outlet is provided with a distributing installation to feed several extruder hoppers from one hot mixer.

12. Installation according to claim 10, wherein the installation is provided with a feed for reprocessed PVC which opens into the hot mixer.

13. Installation according to claim 10, wherein the hot mixer is a horizontal mixer.

14. A hot mixer for use with a plastic extrusion installation comprising:

drive means for driving mixing elements of the hot mixer to a first speed of revolution for providing frictional heat during mixing of plastic and additives;

said drive means being of a two-speed construction controllable by a first control means for driving the mixing elements at said first speed of revolution, or, by second control means for driving the mixing elements at a second control means for driving the mixing elements at a second speed of revolution lower than said first speed of revolution, for homogenizing substantially without providing further frictional heat a hot mixture following the action of the mixing elements at said first speed of revolution, with a supplementary amount of plastic at said second speed of revolution, said supplementary amount of plastic added to the hot mixer by a closable feed means.

15. The hot mixer of claim 14, wherein the plastic being mixed is PVC powder and the second control adjusts the additives concentration in the final mixture to the desired value.

16. Method according to claim 1, wherein the ratio of first amount of PVC powder to the supplementary amount of PVC powder is approximately 1:1.

17. Method according to claim 1, wherein the mixing with the supply of frictional heat is continued unitl the mixture has reached a temperature of between 100° to 140° C.

18. A method for the production of extruded plastic products using an extruder which has an extruder hopper and a mixer having high speed rotating mixing elements, comprising the steps of:

mixing a first amount of PVC with an amount of additives in a hot mixing zone in said mixer, said hot mixing zone provided by frictional heat froms aid high speed rotating mixing elements, thereby forming a first mixture;

adding a second amount of PVC at a lower temperature than said first mixture to said first mixture in said mixing zone;

homogenizing said first mixture and said second amount of PVC in said mixing zone to form a final mixture having a desired concentration of additives, said homogenizing being effected by said mixing elements rotating at a speed which does not substantially produce frictional heat;

feeding said final mixture directly to said extruder hopper from said mixer; and extruding the plastic products.

* * * * *

UNITED STATES PATENT AND TRADEMARK OFFICE
CERTIFICATE OF CORRECTION

PATENT NO. : 5,286,437
DATED : February 15, 1994
INVENTOR(S) : Hendrik SEVERIENS It is certified that error appears in the above-identified patent and that said Letters Patent is hereby corrected as shown below:

Column 1, line 16, after "known" insert --from--.

Column 2, line 46, after "higher" insert --.--.

Column 3, line 60, after "mixer" insert --.--;
line 65, after "additives" insert --.--;
line 68, "con" should be --control--.

Column 4, claim 1, line 45, "ocurring" should be --occurring--.

claim 2, line 52, "laim 1," should be --claim 1,--.

claim 3, line 57, "heated" should be --heat--.

UNITED STATES PATENT AND TRADEMARK OFFICE
CERTIFICATE OF CORRECTION

PATENT NO. : 5,286,437
DATED : February 15, 1994
INVENTOR(S) : Hendrik SEVERIENS It is certified that error appears in the above-identified patent and that said Letters Patent is hereby corrected as shown below:

Column 5, claim 9, line 5, delete "the".

claim 10, line 10, after "PVC", insert --feed and a closable outlet, for mixing PVC--.

Column 6, claim 14, lines 5 and 6, delete "control means for driving the mixing elements at a second".

claim 18, lines 32 and 33, "fromsaid" should be --from said--.

Signed and Sealed this

Second Day of August, 1994

Attest:

BRUCE LEHMAN

*Attesting Officer*     Commissioner of Patents and Trademarks